United States Patent [19]
Joseph

[11] Patent Number: 5,755,383
[45] Date of Patent: May 26, 1998

[54] AUTOMATIC SPRINKLER GARDEN EDGING SYSTEM

[76] Inventor: John S. Joseph, 437 Haverford Rd., Wynnewood, Pa. 19096-2437

[21] Appl. No.: 682,110

[22] Filed: Jul. 17, 1996

[51] Int. Cl.$^6$ .................. A01G 25/06; F16L 9/18
[52] U.S. Cl. .................. 239/276; 239/200; 239/548; 138/114; 138/115; D23/213
[58] Field of Search ............... 239/200, 201, 239/207, 273, 276, 279, 548, 566, 567; D23/213, 214, 215, 217, 222; 138/114, 115

[56] References Cited

U.S. PATENT DOCUMENTS

| | | | |
|---|---|---|---|
| Re. 28,095 | 7/1974 | Chapin | 138/114 X |
| D. 248,312 | 6/1978 | Zatorski | D23/214 |
| D. 332,132 | 12/1992 | Corcoran | D23/217 |
| 2,750,232 | 6/1956 | Szantay et al. | 239/548 X |
| 3,387,786 | 6/1968 | Rynberk | 239/201 |
| 3,865,309 | 2/1975 | Greenhalgh | 239/276 X |
| 4,644,685 | 2/1987 | Tisbo et al. | 47/33 |
| 4,702,034 | 10/1987 | Ferguson et al. | 239/276 X |
| 4,756,339 | 7/1988 | Buluschek | 138/115 |
| 4,779,800 | 10/1988 | Tuomi | 239/276 |
| 4,824,019 | 4/1989 | Lew | 239/279 X |
| 5,232,159 | 8/1993 | Abbate, Sr. et al. | 239/276 |

*Primary Examiner*—Andres Kashnikow
*Assistant Examiner*—Robin O. Evans

[57] ABSTRACT

A new Automatic Sprinkler Garden Edging System for simultaneously bordering and watering a lawn thereby providing an even distribution of water to the lawn while being unnoticed. The inventive device includes a resilient water dispensing cornice, a resilient support wall secured to the resilient water dispensing cornice, and a coupling means removably securing compartments of the present invention together.

7 Claims, 3 Drawing Sheets

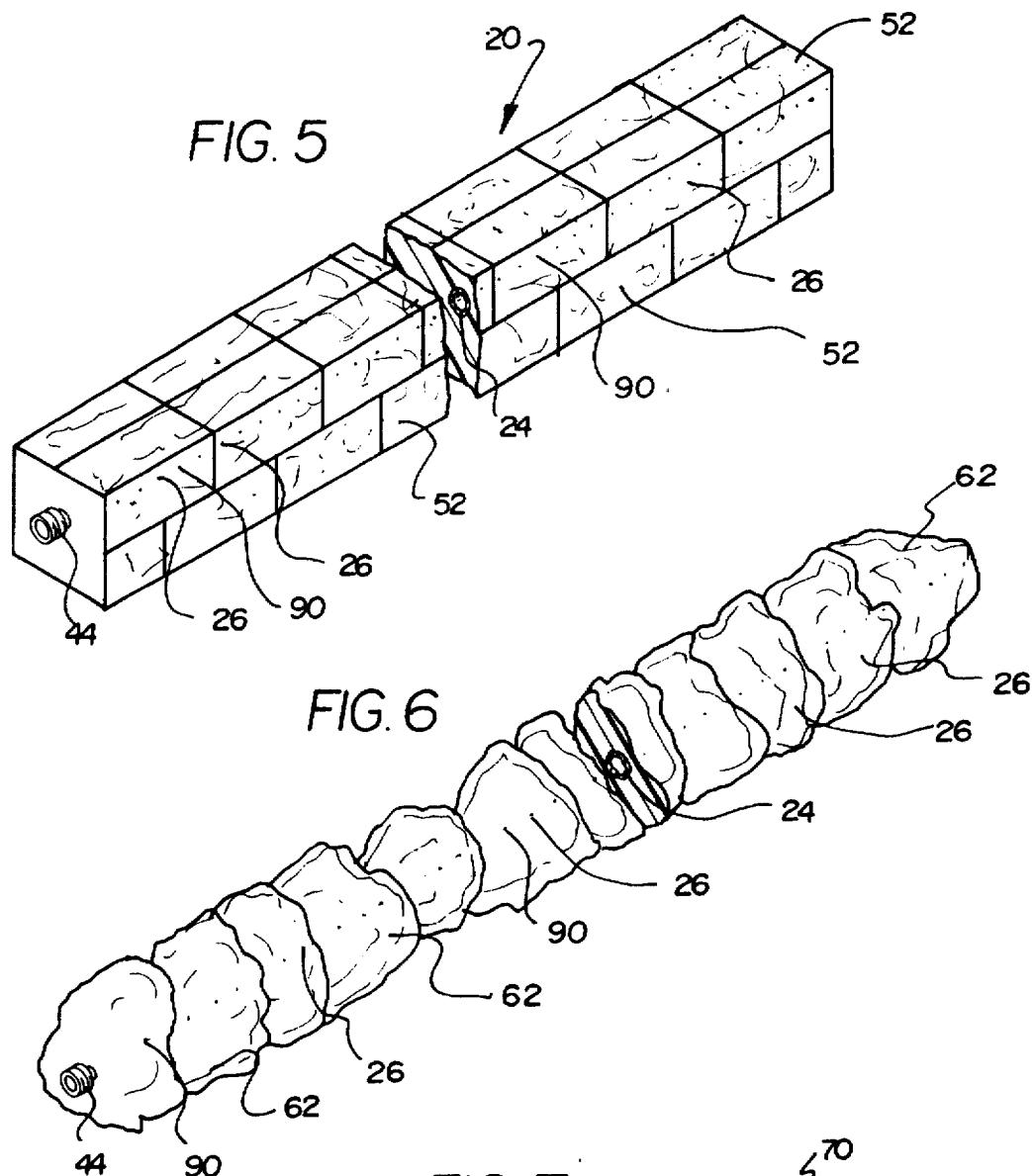
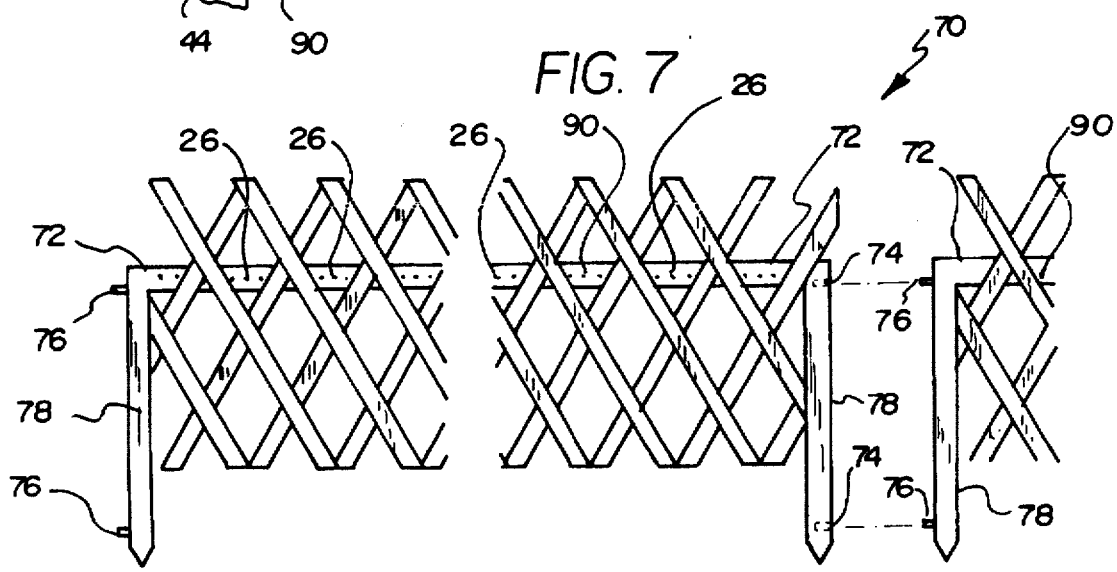

AUTOMATIC SPRINKLER GARDEN EDGING SYSTEM

BACKGROUND OF THE INVENTION

1. Field of the Invention

The present invention relates to Watering Devices and more particularly pertains to a new Automatic Sprinkler Garden Edging System for simultaneously bordering and watering a lawn thereby providing an even distribution of water to the lawn while being unnoticed.

2. Description of the Prior Art

The use of Watering Devices is known in the prior art. More specifically, Watering Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Watering Devices include U.S. Pat. No. 4,702,034; U.S. Pat. No. 4,824,019; U.S. Design Pat. No. 332,132; U.S. Pat. No. 4,779,800; U.S. Pat. No. 4,644,685 and U.S. Pat. No. 5,232,159.

While these devices fulfill their respective, particular objectives and requirements, the aforementioned patents do not disclose a new Automatic Sprinkler Garden Edging System. The inventive device includes a resilient water dispensing cornice, a resilient support wall secured to the resilient water dispensing cornice, and a coupling means removably securing compartments of the present invention together.

In these respects, the Automatic Sprinkler Garden Edging System according to the present invention substantially departs from the conventional concepts and designs of the prior art, and in so doing provides an apparatus primarily developed for the purpose of simultaneously bordering and watering a lawn thereby providing an even distribution of water to the lawn while being unnoticed.

SUMMARY OF THE INVENTION

In view of the foregoing disadvantages inherent in the known types of Watering Devices now present in the prior art, the present invention provides a new Automatic Sprinkler Garden Edging System construction wherein the same can be utilized for simultaneously bordering and watering a lawn thereby providing an even distribution of water to the lawn while being unnoticed.

The general purpose of the present invention, which will be described subsequently in greater detail, is to provide a new Automatic Sprinkler Garden Edging System apparatus and method which has many of the advantages of the Watering Devices mentioned heretofore and many novel features that result in a new Automatic Sprinkler Garden Edging System which is not anticipated, rendered obvious, suggested, or even implied by any of the prior art Watering Devices, either alone or in any combination thereof.

To attain this, the present invention generally comprises a resilient water dispensing cornice, a resilient support wall secured to the resilient water dispensing cornice, and a coupling means removably securing compartments of the present invention together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Automatic Sprinkler Garden Edging System apparatus and method which has many of the advantages of the Watering Devices mentioned heretofore and many novel features that result in a new Automatic Sprinkler Garden Edging System which is not anticipated, rendered obvious, suggested, or even implied by any of the prior art Watering Devices, either alone or in any combination thereof.

It is another object of the present invention to provide a new Automatic Sprinkler Garden Edging System which may be easily and efficiently manufactured and marketed.

It is a further object of the present invention to provide a new Automatic Sprinkler Garden Edging System which is of a durable and reliable construction.

An even further object of the present invention is to provide a new Automatic Sprinkler Garden Edging System which is susceptible of a low cost of manufacture with regard to both materials and labor, and which accordingly is then susceptible of low prices of sale to the consuming public, thereby making such Automatic Sprinkler Garden Edging System economically available to the buying public.

Still yet another object of the present invention is to provide a new Automatic Sprinkler Garden Edging System which provides in the apparatuses and methods of the prior art some of the advantages thereof, while simultaneously overcoming some of the disadvantages normally associated therewith.

Still another object of the present invention is to provide a new Automatic Sprinkler Garden Edging System for simultaneously bordering and watering a lawn thereby providing an even distribution of water to the lawn while being unnoticed.

Yet another object of the present invention is to provide a new Automatic Sprinkler Garden Edging System which includes a resilient water dispensing cornice, a resilient support wall secured to the resilient water dispensing cornice, and a coupling means removably securing compartments of the present invention together.

Still yet another object of the present invention is to provide a new Automatic Sprinkler Garden Edging System that can be integrated within most common structures near a lawn or garden.

Even still another object of the present invention is to provide a new Automatic Sprinkler Garden Edging System that evenly distributes water while being unobtrusive.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side perspective view showing an alternative embodiment comprising a brick edging.

FIG. 6 is a side perspective view showing another alternative embodiment comprising a rock edging.

FIG. 7 is a side perspective view showing another alternative embodiment comprising a fence edging.

DESCRIPTION OF THE PREFERRED EMBODIMENT

Figure 1:
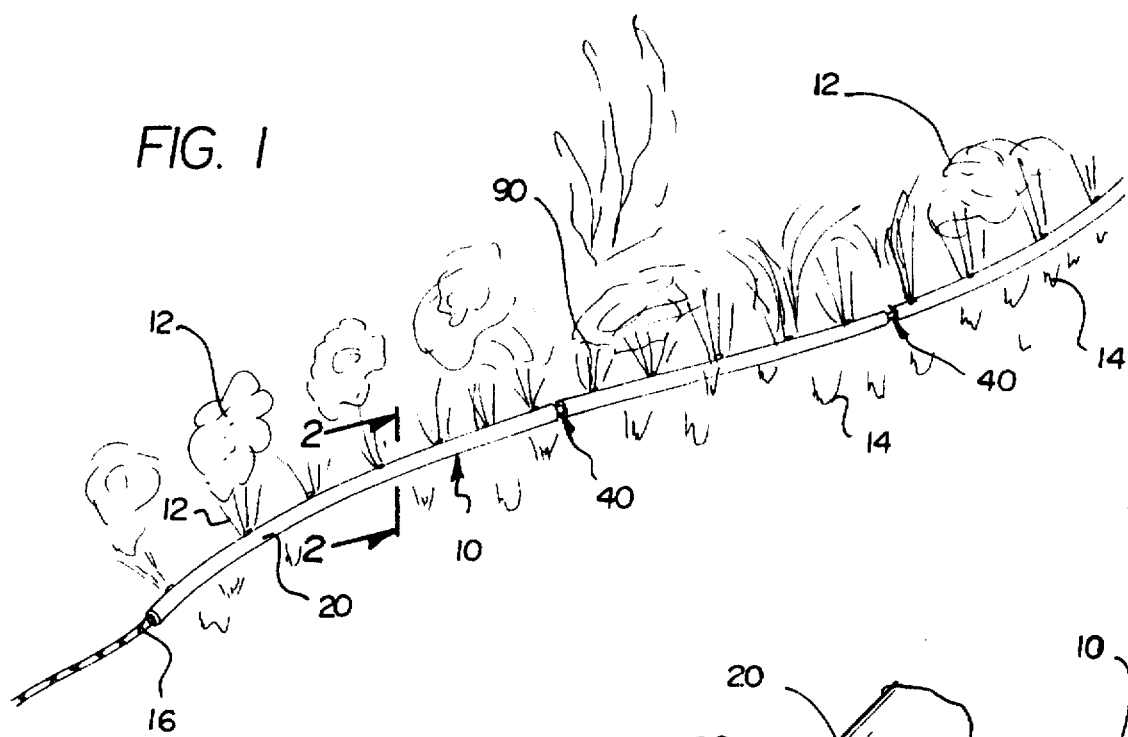
FIG. 1 is a perspective view of a new Automatic Sprinkler Garden Edging System inserted into the ground and watering the grass according to the present invention.

With reference now to the drawings, and in particular to FIGS. 1 through 7 thereof, a new Automatic Sprinkler Garden Edging System embodying the principles and concepts of the present invention and generally designated by the reference numeral 10 will be described.

More specifically, it will be noted that the Automatic Sprinkler Garden Edging System 10 comprises a resilient water dispensing cornice 20, a resilient support wall 30 vertically secured to the lower portion of the resilient water dispensing cornice 20 and a coupling means 40 secured at each end of the resilient water dispensing cornice 20.

Figure 2:
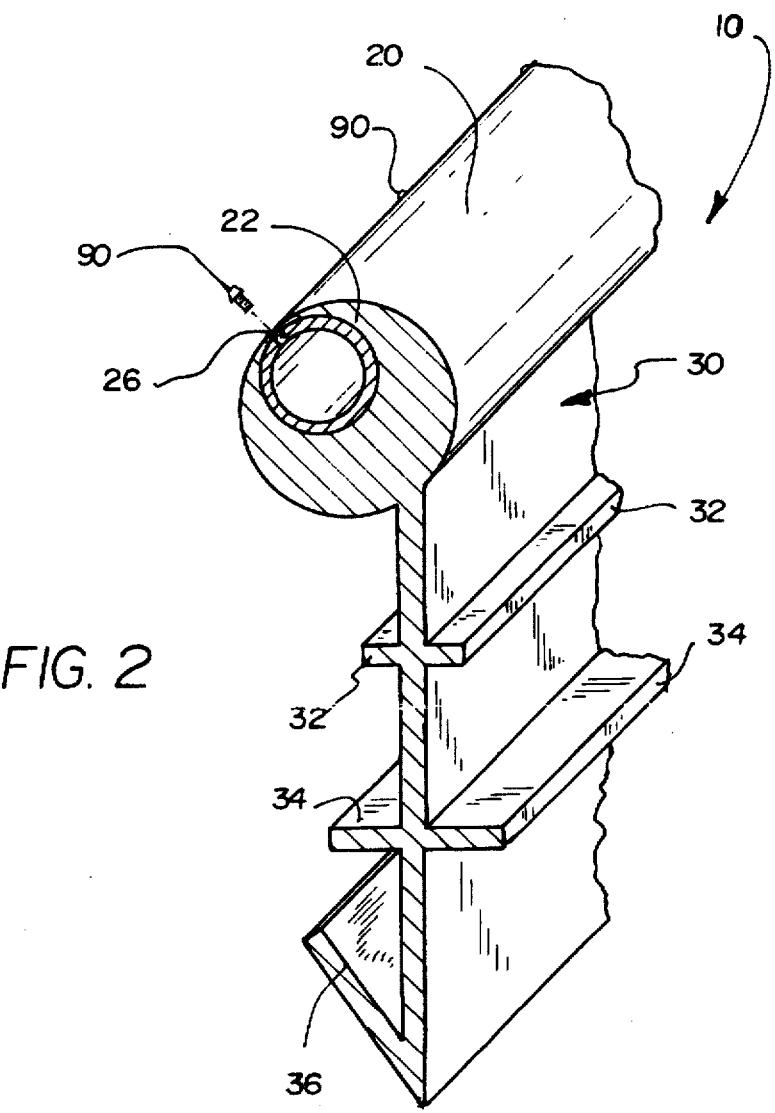
FIG. 2 is a cross sectional view taken along line 2—2 of FIG. 1 disclosing the elongated flexible tube and water nozzle.
Figure 3:
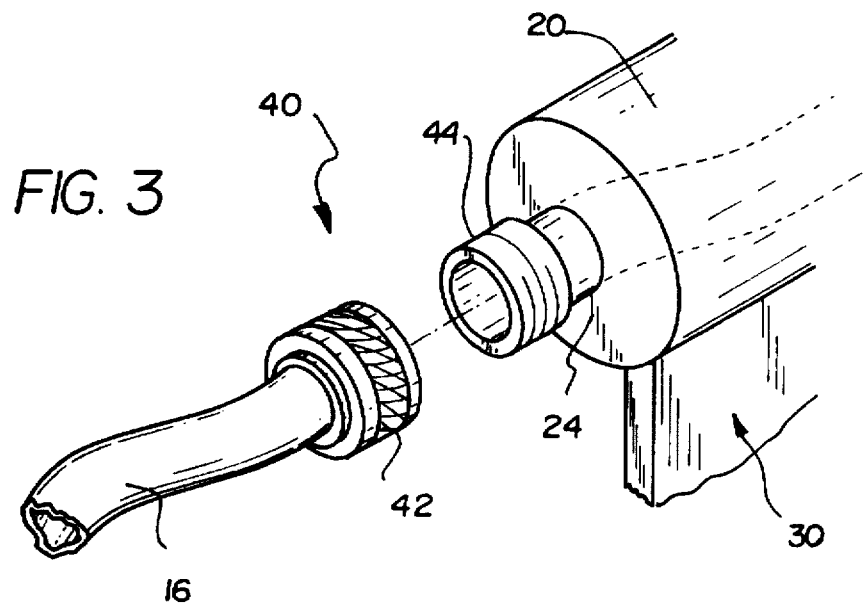
FIG. 3 is an exploded view of the coupling means.
Figure 4:
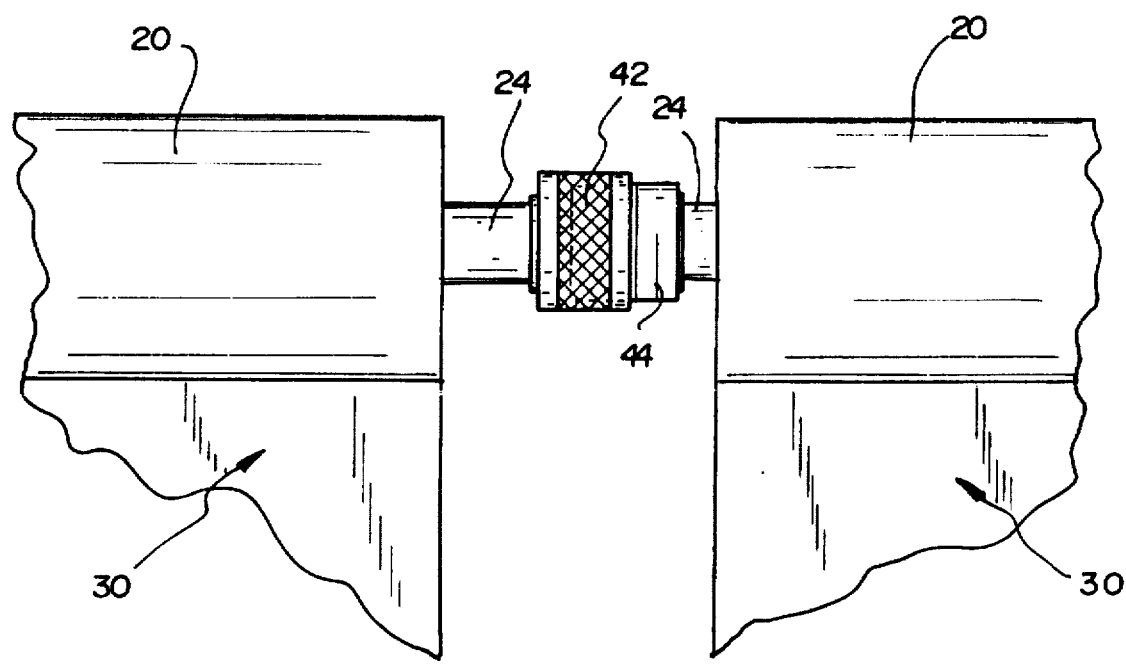
FIG. 4 is a side view of the coupling means with the female hose connector and the male hose connector engaged.

As best illustrated in FIGS. 1 through 4, it can be shown that the resilient water dispensing cornice 20 includes an elongated passage 22 the length of the resilient water dispensing cornice 20. An offset elongated flexible tube 24 is secured within the elongated passage 22. A plurality of water nozzles 26 are horizontally connected to the elongated flexible tube 24 releasing water 12 onto the grass 14. The coupling means 40 includes a female hose connector 42 secured to one end of the elongated flexible tube 24 where the female hose connector 42 removably engages a male hose connector 44 connected to another elongated flexible tube 24 or a garden hose 16 as best shown in FIGS. 3 and 4 of the drawings. A male hose connector 44 is secured to the opposite end of the elongated flexible tube 24. The male hose connector 44 removably engages another female hose connector 42. The resilient support wall 30 includes an upper flange 32 as best shown in FIG. 2 of the drawings. A lower flange 34 is positioned below the upper flange 32. The lower flange is preferably larger in width than the upper flange 32 as best shown in FIG. 2 of the drawings. A fluke 36 is secured to the bottom portion of the resilient support wall 30 opposite of the resilient water dispensing cornice 20 as best shown in FIG. 2 of the drawings.

An alternative embodiment of the present invention includes a brick edging 50 as shown in FIG. 5 of the drawings. The brick edging 50 includes an unnumbered ornamental body and a coupling means 40 secured to each end of the unnumbered ornamental body. The unnumbered ornamental body includes an elongated passage 22, an elongated flexible tube 24 secured within the elongated passage 22, and a plurality of water nozzles 26 connected to the elongated flexible tube 24 that release water 12 onto the grass 14. The coupling means 40 includes a female hose connector 42 secured to one end of the elongated flexible tube 24 where the female hose connector 42 removably engages a male hose connector 44 connected to another elongated flexible tube 24 or a garden hose 16. A male hose connector 44 secured to the opposite end of the elongated flexible tube 24 where the male hose connector 44 removably engages another female hose connector 42. The unnumbered ornamental body comprises a brick member 52 substantially rectangular shaped as shown in FIG. 5 of the drawings. Alternatively the unnumbered ornamental body includes a rock member 62 shaped like a plurality of rocks as shown in FIG. 6 of the drawings. Another alternative for the unnumbered ornamental body comprises a horizontal fence beam 72 connected to a plurality of fence shafts 78 where the fence shaft 78 includes at least one dowel passage 74 which receives a coupling dowel 76 secured to another fence shaft 78 as shown in FIG. 7 of the drawings.

In use, the user connects garden hose 16 to the female hose connector 42. The water 12 flows through the elongated flexible tube 24 and is dispensed through the plurality of water nozzles 26. The water 12 flows onto the grass 14 providing an even distribution of the water 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn edging sprinkler system comprising:

a resilient water dispensing cornice;

an offset elongated flexible tube secured within the water dispensing cornice;

a plurality of water nozzles connected to the elongated flexible tube, the nozzles leading from an interior of the tube out through the cornice such that the nozzles release water onto the grass;

a resilient support wall disposed outwardly from a lower portion of the resilient water dispensing cornice; and a coupling means secured at each end of the resilient water dispensing cornice.

2. The lawn edging sprinkler system of claim 1, wherein the flexible tube extends outwardly from each end of the cornice, the coupling means further comprising:

a female hose connector secured to one end of the elongated flexible tube where the female hose connector removably engages a male hose connector connected to another elongated flexible tube or a garden hose; and a male hose connector secured to the opposite end of the elongated flexible tube where the male hose connector removably engages another female hose connector.

3. The lawn edging sprinkler system of claim 2, wherein the resilient support wall has a uniform cross section throughout the length of the resilient support wall, the resilient support wall including:

an upper flange;

a lower flange positioned below the upper flange and larger in width than the upper flange; and a fluke disposed from a distal end of the resilient support wall.

4. The lawn edging sprinkler system of claim 3, wherein the resilient water dispensing cornice has an ornamental shape.

5. The lawn edging sprinkler system of claim 4, wherein the ornamental shape comprises a substantially rectangularly shaped brick member.

6. The lawn edging sprinkler system of claim 4, wherein the ornamental shape comprises a plurality of aligned rocks.

7. The lawn edging sprinkler system of claim 4, wherein the ornamental shape comprises a horizontal fence beam connected to a plurality of fence shafts where the fence shaft includes at least one dowel passage which receives a coupling dowel secured to another fence shaft.

* * * * *